(12) United States Patent
Schneider et al.

(10) Patent No.: US 8,862,531 B2
(45) Date of Patent: Oct. 14, 2014

(54) KNOWLEDGE BASED ENCODING OF DATA

(75) Inventors: John C. Schneider, Bellevue, WA (US);
Richard A. Rollman, Sammamish, WA (US); Milen Nankov, Sammamish, WA (US); Ethan Hugg, Seattle, WA (US)

(73) Assignee: AgileDelta, Inc., Bellevue, WA (US)

( * ) Notice: Subject to any disclaimer, the term of this patent is extended or adjusted under 35 U.S.C. 154(b) by 133 days.

(21) Appl. No.: 12/506,955

(22) Filed: Jul. 21, 2009

(65) Prior Publication Data

US 2010/0023470 A1    Jan. 28, 2010

Related U.S. Application Data

(62) Division of application No. 11/394,662, filed on Mar. 31, 2006, now Pat. No. 7,565,339.

(51) Int. Cl.
  *G06N 5/02* (2006.01)
  *H04L 9/34* (2006.01)
  *H04L 9/28* (2006.01)
  *H04L 9/08* (2006.01)

(52) U.S. Cl.
  CPC ... *G06N 5/02* (2013.01); *H04L 9/34* (2013.01); *G06N 5/022* (2013.01); *H04L 9/28* (2013.01); *H04L 9/0894* (2013.01)
  USPC .............................................. 706/47; 706/45

(58) Field of Classification Search
  USPC ...................................... 706/47, 45
  See application file for complete search history.

(56) References Cited

U.S. PATENT DOCUMENTS

| | | | |
|---|---|---|---|
| 5,991,515 A | 11/1999 | Fall et al. | |
| 6,026,082 A | 2/2000 | Astrin | |
| 6,154,542 A | 11/2000 | Crandall | |
| 6,405,159 B2 | 6/2002 | Bushey et al. | |
| 6,754,221 B1 | 6/2004 | Whitcher et al. | |
| 6,844,506 B2 | 1/2005 | Nuesch et al. | |
| 7,086,007 B1 | 8/2006 | Bushey et al. | |
| 7,089,499 B2 | 8/2006 | Steichen et al. | |
| 7,143,397 B2 | 11/2006 | Imaura | |
| 2001/0056504 A1 | 12/2001 | Kuznetsov | |
| 2002/0100027 A1 | 7/2002 | Binding et al. | |
| 2006/0184547 A1 | 8/2006 | Kamiya | |

OTHER PUBLICATIONS

Kelsey, Compression and Information Leakage of Plaintext, Fast Software Encryption, 9th International Workshop, FSE 2002, Leuven, Belgium, Feb. 4-6, 2002, Revised Papers, vol. 2365, 2002, pp. 263-276.*

Huang, Lossless Semantic Compression for Relational Databases, Thesis, Simon Fraser University, Nov. 2001, pp. 1-61.*

Imamura et al., "Mapping between ASN.1 and XML,"IEEE, 2001, pp. 57-64.

International Search Report, mailed Jul. 23, 2008 for PCT/US07/65707.

* cited by examiner

*Primary Examiner* — Wilbert L Starks
(74) *Attorney, Agent, or Firm* — Schwabe Williamson & Wyatt PC

(57) ABSTRACT

Methods, apparatuses, and articles of manufacture for receiving data from one or more processes, receiving or deriving a knowledge representation describing the data, which may include one or more finite automata, determining a plurality of values for encoding the data, said determining based at least in part on the knowledge representation of the data, which may include one or more finite automata, and generating the plurality of encoding values to encode the data, are described herein.

16 Claims, 11 Drawing Sheets

Knowledge of Data (XML Schema Fragment)      402a

```
<xs:element name="note">
  <xs:complexType>
   <xs:sequence>
       <xs:element name="to" type="xs:string"/>
       <xs:element name="from" type="xs:string"/>
       <xs:element name="heading" type="xs:string"/>
       <xs:element name="body" type="xs:string"/>
   </xs:sequence>
  </xs:complexType>
</xs:element>
```

FIG. 4a

Representation of Knowledge (Finite Automaton)      404b

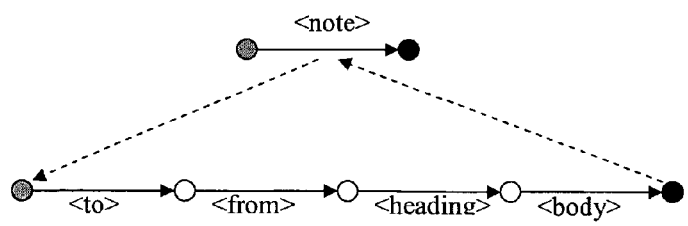

FIG. 4b

Knowledge of Data (XML Schema Fragment)    406c

```
<xs:group name="ownergroup">
  <xs:sequence>
    <xs:element name="ownerName" type="xs:string"/>
    <xs:element name="ownerAddress" type="xs:string"/>
  </xs:sequence>
</xs:group>
<xs:group name="petgroup">
  <xs:sequence>
    <xs:element name="petName" type="xs:string"/>
    <xs:element name="petColor" type="xs:string"/>
  </xs:sequence>
</xs:group>
<xs:group name="adopternamegroup">
  <xs:sequence>
    <xs:element name="isAdopted" type="xs:boolean"/>
    <xs:element name="shots" type="xs:boolean"/>
  </xs:sequence>
</xs:group>
<xs:element name="pet">
  <xs:complexType>
    <xs:choice>
      <xs:group ref="ownergroup"/>
      <xs:group ref="petgroup"/>
      <xs:element name="adopted">
        <xs:complexType>
          <xs:choice>
            <xs:group ref="adopternamegroup"/>
            <xs:element name="isNotAdopted" type="xs:boolean"/>
          </xs:choice>
        </xs:complexType>
      </xs:element>
    </xs:choice>
  </xs:complexType>
</xs:element>
```

FIG. 4c

Knowledge of Data (XML Schema Fragment)    502a

```
<xs:element name="note">
  <xs:complexType>
    <xs:sequence>
        <xs:element name="to" type="xs:string"/>
        <xs:element name="from" type="xs:string"/>
        <xs:element name="heading" type="xs:string"/>
        <xs:element name="body" type="xs:string"/>
    </xs:sequence>
  </xs:complexType>
</xs:element>
```

FIG. 5a

Data (XML Fragment Deviating from Schema)    504b

```
<note>
<to>Tove</to>
<from>Jani</from>
<heading>Reminder</heading>
<date>October 17</date>
<body>Don't forget me this weekend!</body>
</note>
```

FIG. 5b

Representation of Knowledge Including Deviations (Finite Automaton)    506c

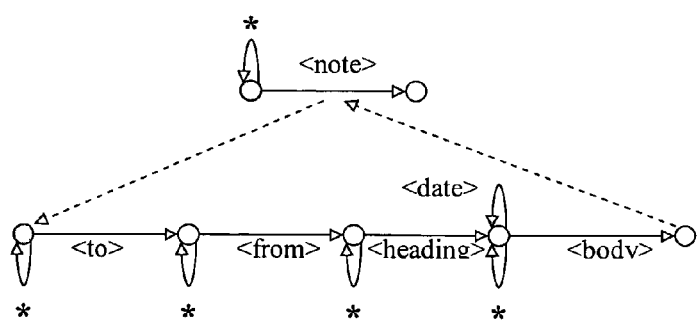

FIG. 5c

KNOWLEDGE BASED ENCODING OF DATA

CROSS-REFERENCE TO RELATED APPLICATIONS

This application is a divisional patent application of, and claims the benefit of U.S. application Ser. No. 11/394,662, filed on 31 Mar. 2006, entitled "KNOWLEDGE BASED ENCODING OF DATA," the filing date of which is hereby claimed under 35 U.S.C. §119(e).

STATEMENT REGARDING GOVERNMENT SPONSORED RESEARCH OR DEVELOPMENT

This invention was made with government support under contract FA8750-06-C-0038 awarded by The Air Force Research Lab. The government has certain rights in the invention.

TECHNICAL FIELD

Embodiments of the present invention relate to the field of data processing, in particular, to encoding and decoding data based at least in part on knowledge of the data.

BACKGROUND

Various encoding and decoding techniques have been developed and employed to facilitate efficient storage and/or transfer of data, e.g. media data, such as video and/or audio data.

Increasingly, the Extensible Markup Language (XML) has become the standard for sharing data over networks such as the Internet. With advances in networking, processor speed, memory, and client server/architecture enabling increased information sharing, the need for a language representing data in a platform independent manner became increasingly clear. Though capable of connecting to each other over the Internet and other networks, many computing devices struggled to share data due to their differing platforms. XML answered this need by separating data from programming and display language specific requirements, and facilitating the representation of the data itself and its structure, utilizing "elements" that described the data in a nested fashion (see FIG. 5b for an example of XML).

XML has become so prevalent that numerous other languages and standards based on XML have been developed. These languages and standards include XSL (the Extensible Stylesheet Language), which describes how an XML document is to be displayed; XSLT (Extensible Stylesheet Language Transformations), which transforms XML documents into other XML documents or into XHTML documents (Extensible Hypertext Markup Language); XPath, which is a language for finding information in an XML document; XQuery, which facilitates the querying of XML documents; DTD (Document Type Definition), which defines the legal building blocks (elements) of an XML document; and XML Schema Language, which serves as an XML-based alternative to DTDs, declaring elements that may occur in an XML document and the order of their occurrence. Numerous application interfaces, such as the XML DOM (Document Object Model), have also arisen, facilitating the accessing and manipulating of XML documents.

Given the increasing processor speeds of personal computers and workstations and the increasing use of fast, efficient broadband network connections, the large size of XML documents has not always been seen as a problem. However, from XML's inception, it has been recognized that its very large size (relative to its content) would be problematic for computer systems and enterprises that have high efficiency needs. With the revolution in small, mobile device technology, the problems of XML efficiency have become more acute. Mobile devices are limited by their size to smaller storage, memory, and bandwidth. An XML document that might not overwhelm a PC on a broadband connection might pose serious problems for a cell phone or PDA. For these devices, large XML files take too long to download, require too much memory and require lengthy processing times, draining the device's battery. In addition, providers of network connectivity for some of these devices bill for the amount of data transferred rather than the amount of time connected, leading to increasingly large bills for mobile devices. Thus, the large size and situational inefficiency of XML are becoming problematic.

In response, a number of application-specific and proprietary tools for reducing the size of XML have been developed. Such tools include ASN-1, WAP WB-XML, Millau, and compression tools such as Win-Zip. None of these tools, however, provides an efficient version of XML that works well for the full range of XML, including small documents, large documents, strongly typed data and loosely typed documents. In addition, none of them support the extensibility and flexibility required by XML applications and none of them scale well for a wide range of small, mobile devices and large, high-processing power devices.

BRIEF DESCRIPTION OF THE DRAWINGS

Embodiments of the present invention will be described by way of exemplary embodiments, but not limitations, illustrated in the accompanying drawings in which like references denote similar elements, and in which:

FIGS. 4a-4d illustrate exemplary schemas providing knowledge of the received data, and finite automata representing those schemas, in accordance with various embodiments of the invention;

FIGS. 5a-5c illustrate an exemplary schema providing knowledge of the received data, received XML data having deviations from the schema, and a finite automaton representing both the schema and deviations from the schema, in accordance with various embodiments of the invention;

DETAILED DESCRIPTION OF ILLUSTRATIVE EMBODIMENTS

Illustrative embodiments of the present invention include but are not limited to methods and apparatuses for receiving data from one or more processes, receiving or deriving a knowledge representation describing the data, which may include one or more finite automata, determining a plurality of values for encoding the data, said determining based at least in part on the knowledge representation of the data, which may include one or more finite automata, and generating the plurality of encoding values to encode the data.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
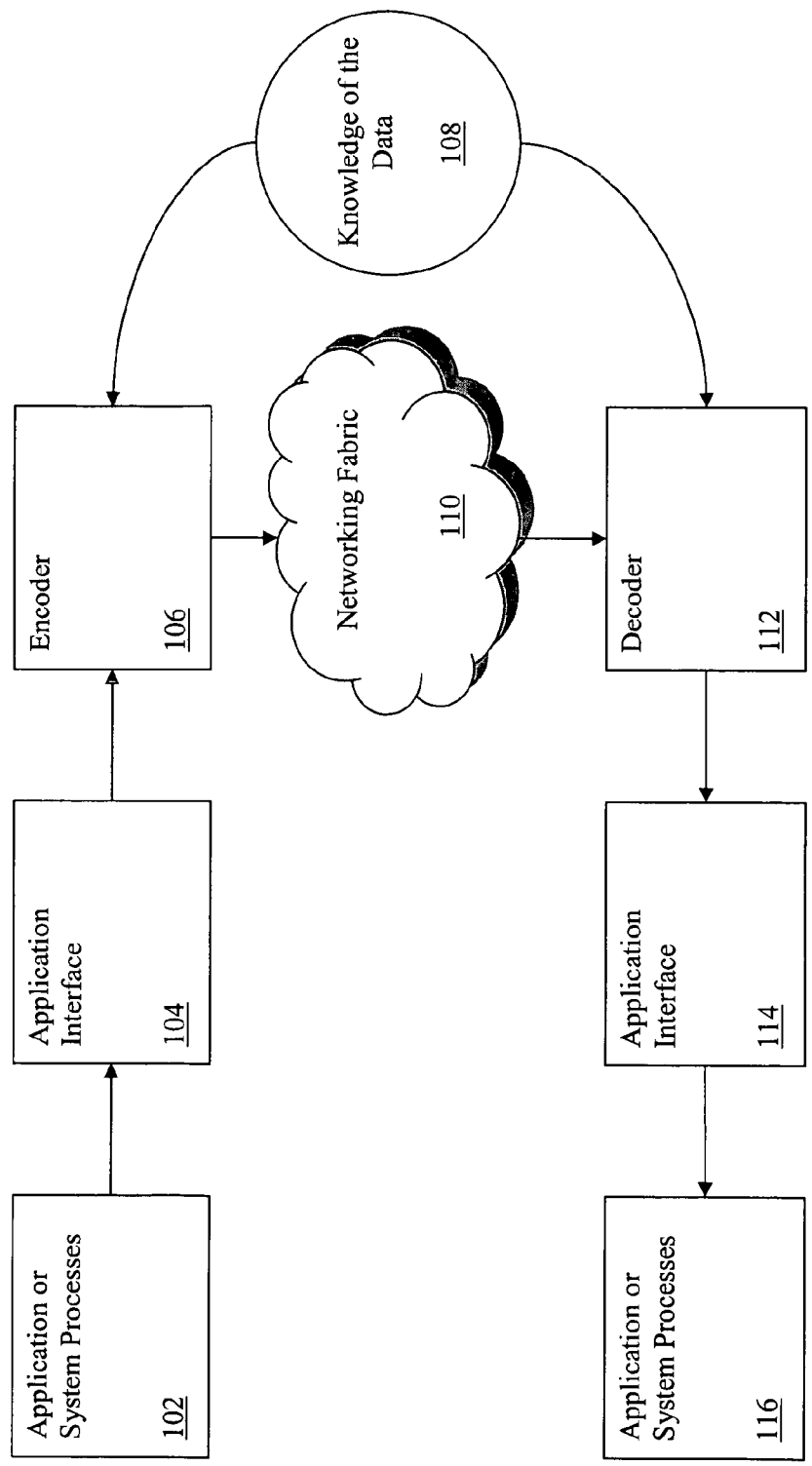
FIG. 1 illustrates an overview of the invention, in accordance with various embodiments.

FIG. 1 illustrates an overview of the present invention, in accordance with various embodiments. As illustrated, for the embodiments, encoder 106 incorporated with the teachings of the present invention, receives data from one or more application or system processes 102, via an application interface (API) 104. Encoder 106, as will be described in more detail below, encodes data based at least in part on one or more knowledge representations of the data, compiled from knowledge of the data. In various embodiments, the knowledge representations of the received data 108 may comprise one or more finite automata (deterministic or non-deterministic). Encoder 106 may determine and generate encoding values for the received data based on knowledge compiled into the one or more finite automata. Upon generating the encoding values, encoder 106 may either send the values to decoder 112 via a networking fabric 110, or may, in other embodiments not shown here, write the values onto one or more storage media for transfer to the device having the decoder. Upon receipt of the encoding values, decoder 112 incorporated with the teachings of the present invention, may recover the data corresponding to the encoded values and re-generate the data accordingly. The recovery of the data may be based at least in part on the knowledge representation of the data, which may include one or more finite automata.

Upon recovering the data, one or more application or system processes 116 may access the data from decoder 112, in some embodiments via an API 114.

In various embodiments, application or system processes 102, API 104 and encoder 106 may be implemented in one device or system, while decoder 112, API 114, and application or system processes 116 may be implemented on another device or system. Knowledge of the data 108 may be compiled on a separate device from the encoder 106 and decoder 112. In various embodiments, a device or system may have both encoder 106 and decoder 112 for encoding and decoding transmit and receive data respectively. In various embodiments, some or all of the computer systems embodied with encoder 106 and/or decoder 112 may be coupled with each other by one or more networks, such as networking fabric 110, and the networks may be of any type known in the art, such as a local area network (LAN) or a wide area network (WAN), private or public, e.g. the Internet. In various embodiments, some or all of the computer systems may not be networked, and may require users of the computer systems to facilitate transfer of the encoded and/or decoded data and/or knowledge representations of the data between the computer systems, e.g. via removable storage media.

Application or system processes 102 and 116 may be any sort of executing application(s) and/or system service(s) known in the art capable of generating and consuming data. Data generated and consumed by application or system processes 102 and 116 may include one or more of XML data, raw, unstructured data, character data, and/or data organized into structures, such as those defined by a programming language (e.g., the C Language) or an interface definition language (IDL) (e.g., CORBA IDL). The data, however, need not be one of the above, but may be any sort of data known in the art (i.e., any combination of zero, one, or more bits). In some embodiments, application or system processes 102 may provide the data to API 104 using one or more of tree structures, streams of data items, streams of bytes, and structures defined by a programming language or IDL. API 114 may provide the data to application or system processes 116 using any of the above, same structures. Additionally, the data may be provided as one or more of the data types integer, long, short, byte, string, date, Boolean, float, double, qualified name, byte array, and typed list.

As shown, APIs 104 and 114 may be implemented as separate processes, or in alternate embodiments, may form an executing layer of the encoder 106 and decoder 112. In various embodiments, APIs 104 and 114 may conform to one or more of the XML Document Object Model (DOM), Simple API for XML (SAX), Streaming API for XML (StAX), and Java API for XML Binding (JAXB).

As is further illustrated, knowledge of the data 108 is shared knowledge—that is—knowledge available to both encoder 106 and decoder 112. The knowledge of the data may be provided in advance to one or both of encoder 106 and decoder 112, may be acquired from one or more separate processes as needed, or may be derived from the received data by analysis, the analysis deriving the knowledge of the data 108 either being performed prior to determining encoding values (if encoder 106) or prior to determining the data (if decoder 112), or may be performed concurrently by either while performing the above determinations. Further, after the encoder 106 has performed the above analysis, encoder 106 may represent the knowledge of the data 108 as one or more additional values and may communicate the knowledge of the data 108 as one or more additional values along with the other generated encoding values to decoder 112. In some embodiments, at least a portion of knowledge 108 may be provided using one or more of a grammar, a regular expression, a database schema, a schema language, a programming language and/or an IDL. Specific examples may include the XML Schema Language, the RelaxNG schema language, the XML DTD language, Backus-Naur Form (BNF), extended BNF, regular expressions, Java, C++, C#, C, and CORBA, but the knowledge may be provided through any sort of method of data structuring known in the art. Each or all of these different ways to convey knowledge of the data may be compiled down to a common knowledge representation, which may include one or more finite automata. Thus, systems using the compiled knowledge representation need not understand XML Schema Language, BNF, etc.

In other embodiments, knowledge of the data 108 is not provided to or derived by encoder 106 and decoder 112, but is instead compiled separately by another system or process into one or more knowledge representations of the data, which may include finite automata. The knowledge representations, rather than knowledge of the data 108, may then be provided to encoder 106 and decoder 112.

Figure 2:
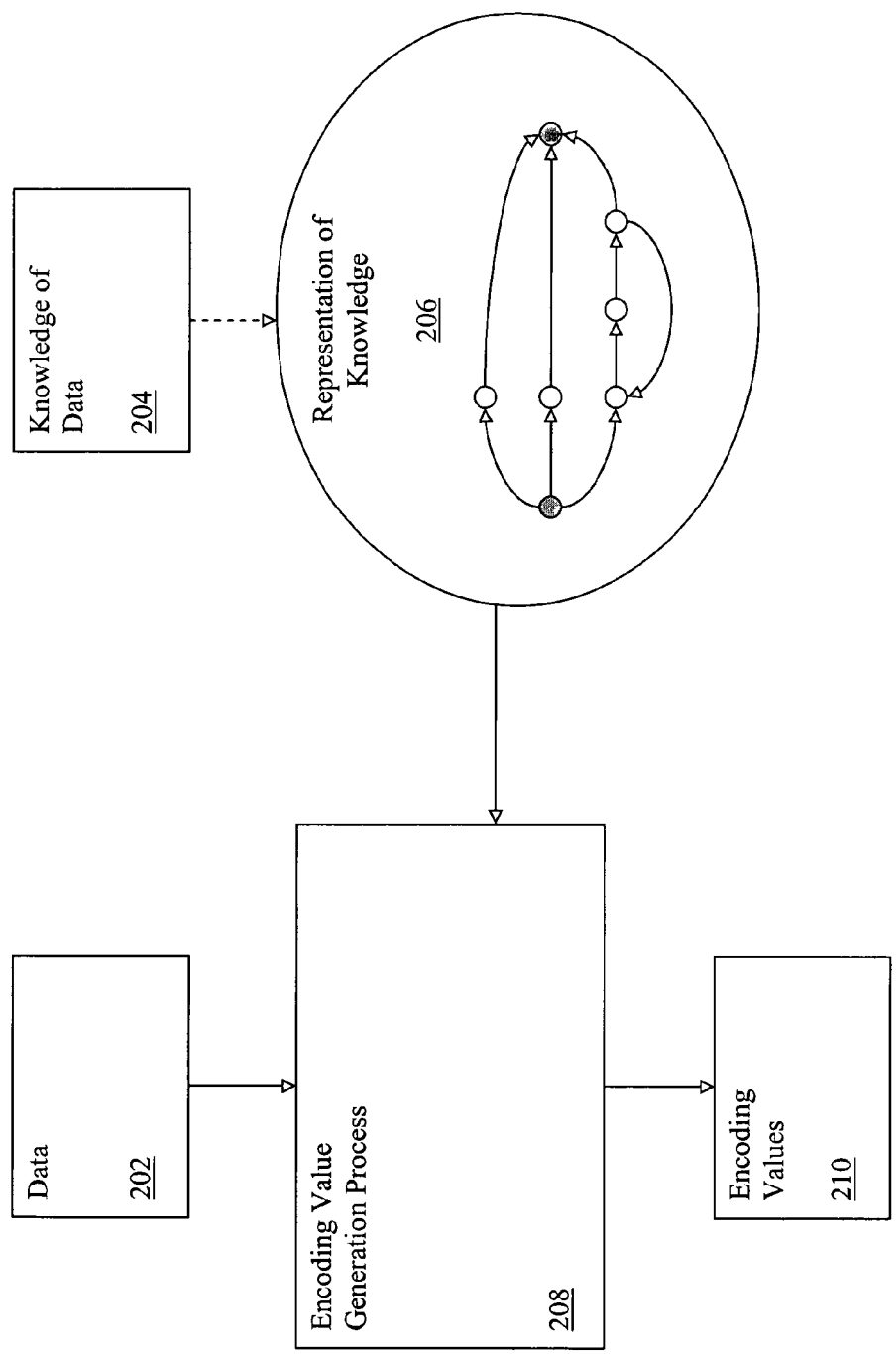
FIG. 2 illustrates in further detail selected aspects of an encoder of the invention, in accordance with various embodiments.
Figure 3:
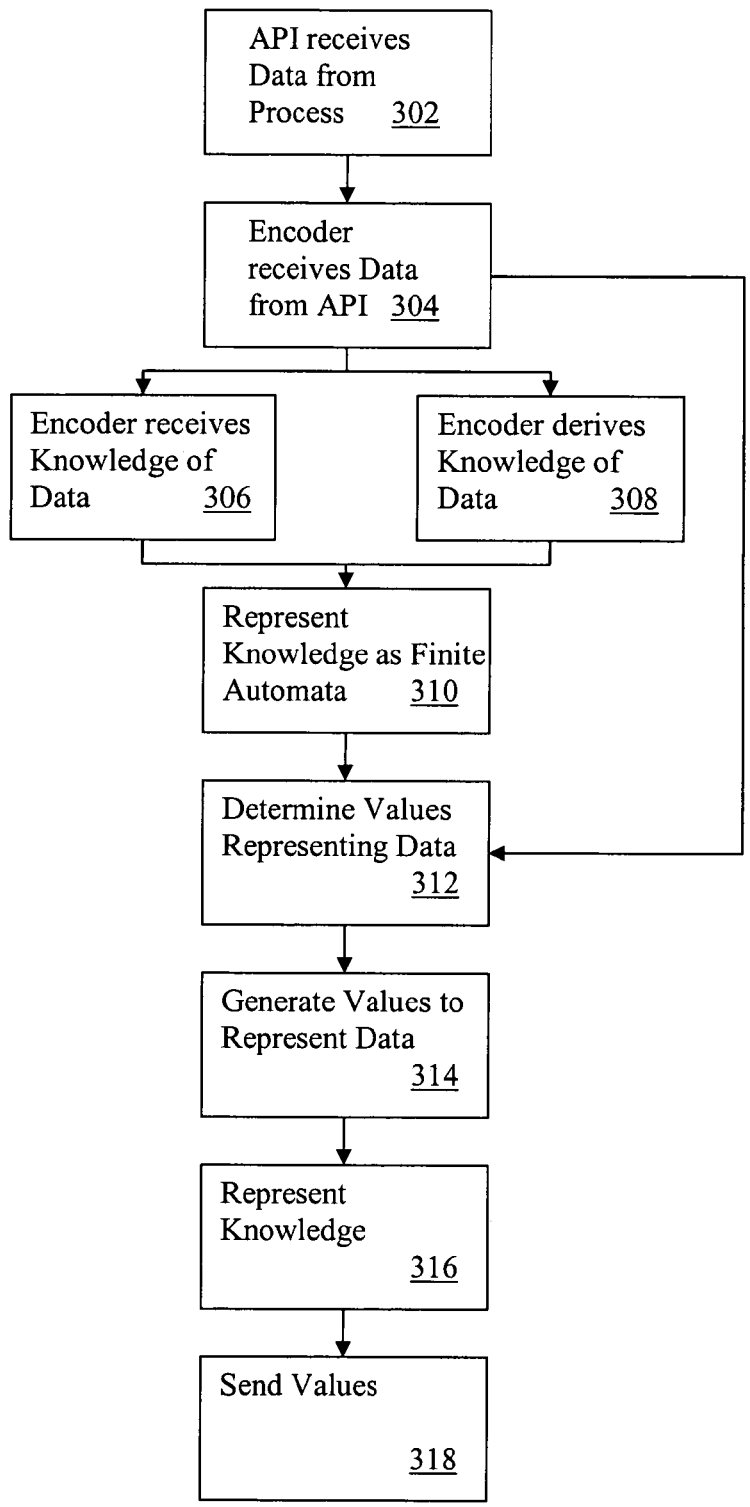
FIG. 3 illustrates a flow chart view of selected operations needed to represent received data as encoded values, facilitated by one or more finite automata, in accordance with various embodiments.
Figure 7:
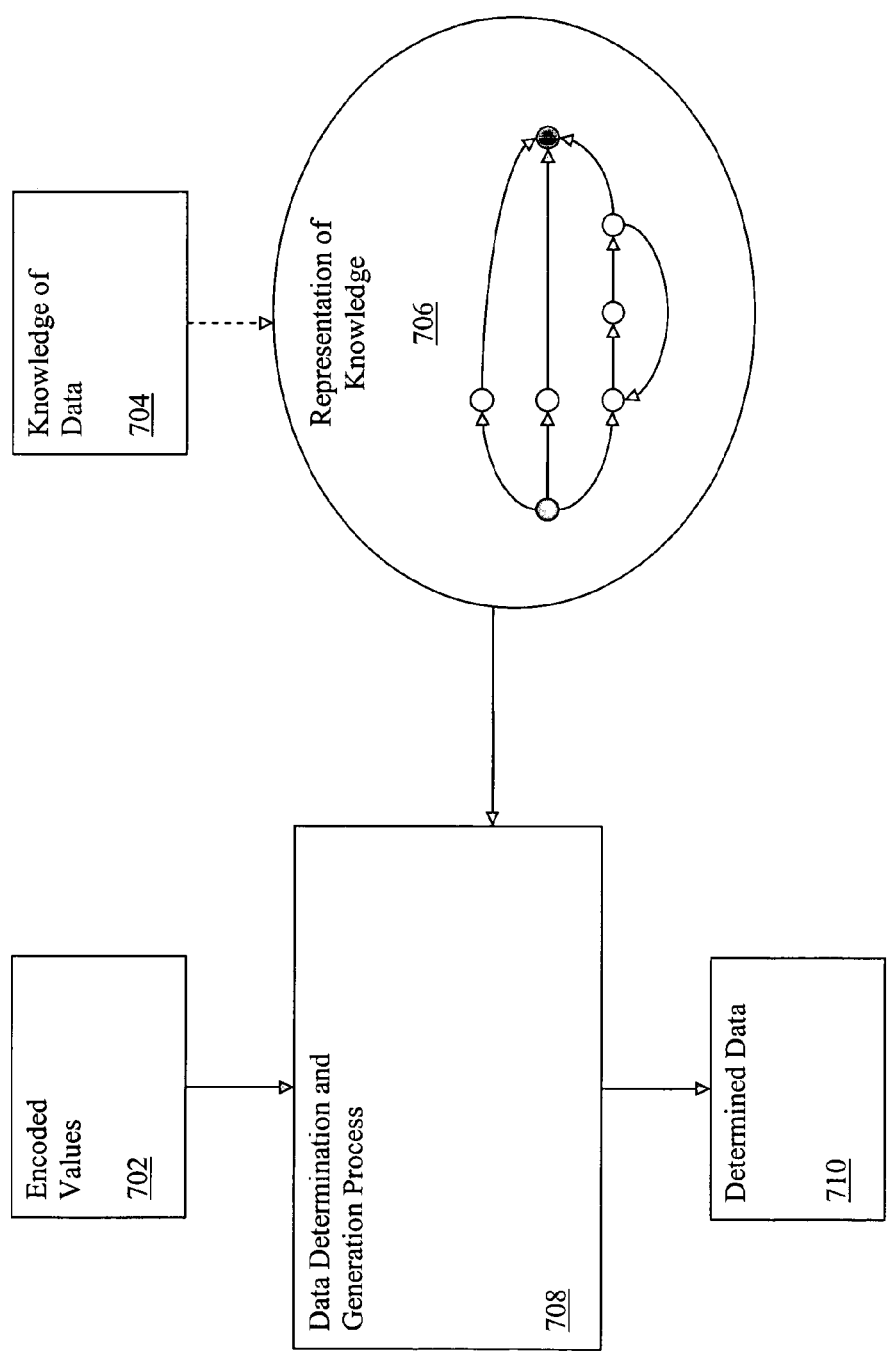
FIG. 7 illustrates in further detail selected aspects of a decoder of the invention, in accordance with various embodiments.
Figure 8:
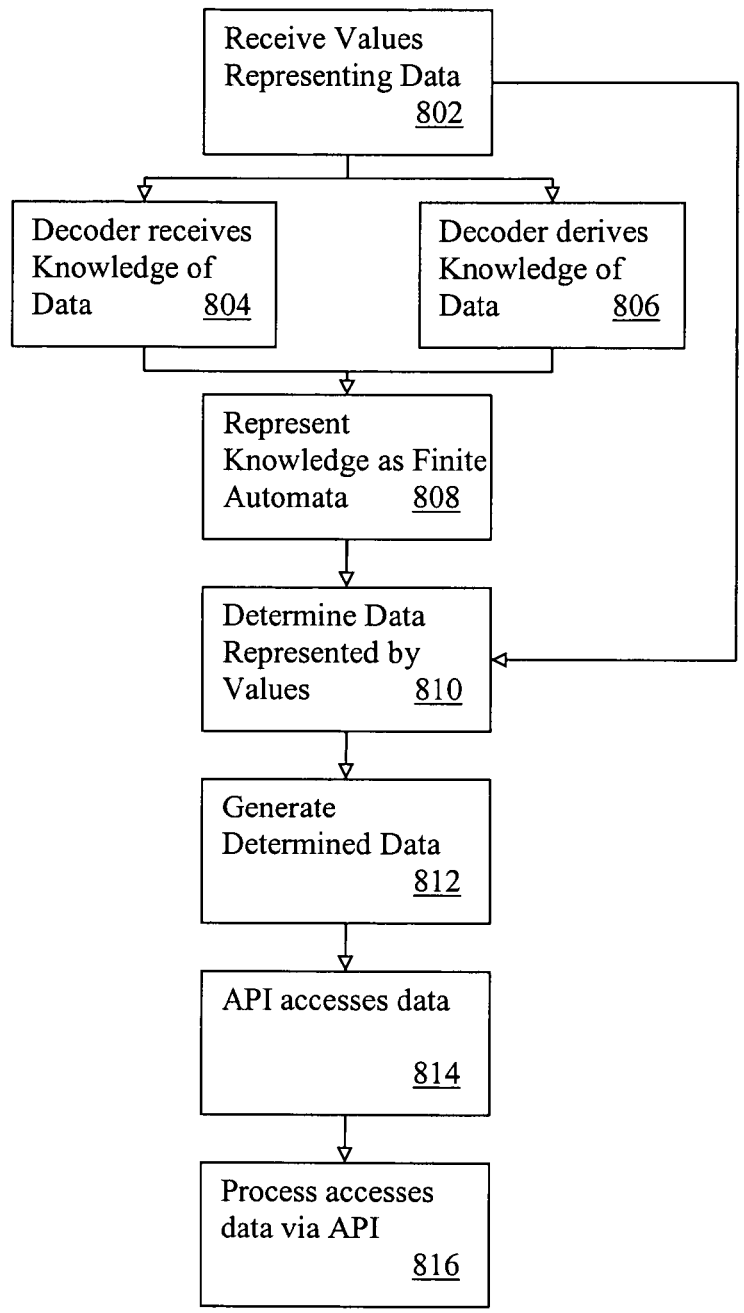
FIG. 8 illustrates a flow chart view of selected operations needed to determine data corresponding to encoded values, facilitated by one or more finite automata, in accordance with various embodiments.

Encoder 106 and decoder 112 may be implemented as one or more processes capable or receiving data (if encoder 106) or values representing data (if decoder 112), receiving or deriving a knowledge representation describing the data, which may include one or more finite automata, determining either values to represent the data (if encoder 106) or data represented by the values (if decoder 112), based at least in part on the knowledge representation of the data, such as one or more finite automata, and generating either the encoding values (if encoder 106) or the data (decoder 112). Details of selected aspects of these operations as performed by the encoder 106 are depicted in FIGS. 2 and 3, and discussed further below. Details of selected aspects of these operations as performed by decoder 112 are depicted in FIGS. 7 and 8 and discussed further below.

Additionally, as shown, networking fabric 110 may be any sort of network known in the art, such as a LAN, WAN, or the Internet. Networking fabric 110 may further utilize any sort of connection known in the art, such as Transmission Control Protocol/Internet Protocol (TCP/IP) connections, or Asynchronous Transfer Mode (ATM) virtual connections.

FIG. 2 illustrates in further detail selected aspects of an encoder of the invention, in accordance with various embodiments. Encoder 106 may be implemented as one or more processes, such as encoding value generation process 208, capable or receiving data, receiving or deriving a knowledge representation describing the data, which may include one or more finite automata, determining encoding values to encode the data, based at least in part on the knowledge representation, and generating the encoding values. The processes of the encoder may all be implemented on one computer system or on several, as a distributed process or processes on several computer systems of a network.

As shown, encoder 106 receives data 202 which the encoder 106 will represent as a shorter sequence of lower entropy values 210. Encoder 106, as described earlier, may receive the data 202 directly from one or more application or system processes 102, or may receive the data via an API 104. Data 202 may be any sequence of zero, one, or more bits, and may or may not have a structure. In various embodiments, data 202 is structured as XML data, character data, data from a database, structures defined by a programming language, and/or structures defined by an IDL. Further, some of the data items specified by the structure of data 202 and contained within data 202 may be provided to encoder 106 as one or more of the data types integer, long, short, byte, string, date, Boolean, float, double, qualified name, byte array, and/or typed list. In some embodiments, knowledge of the received data 204 (discussed more below) may facilitate automatic conversion of typed data items of data 202 from their provided types to another data type or types determined by the knowledge of the data 204.

In various embodiments, as described earlier, data 202 is provided to encoder 106 via an API 104. API 104 may be implemented as a separate process or processes, or may form an executing layer of the encoder 106 process. Additionally, API 104 may be implemented on the same computer system as encoder 106 or on a separate computer system, in some embodiments connected by a network. In other embodiments, API 104 and encoder 106 may execute as separate processes on unconnected computer systems, and may require a user or users of the system to transfer the provided data. API 104 may also conform to one or more of the XML DOM, Simple API for XML (SAX), Streaming API for XML (StAX), and Java API for XML Binding (JAXB).

As illustrated, knowledge of the data 204 may be any sort of structure or grammar describing the content and relationships of data known in the art. Knowledge of the data 204 may include regular expressions, database schemas, schema languages, programming languages, and/or IDLs. Specific examples include the XML Schema Language (as shown in the schema fragments of FIGS. 4a, 4c, and 5a), the RelaxNG schema language, the XML DTD language, BNF, extended BNF, Java, C, C++, C#, and CORBA. A more detailed description of knowledge of the data 204 as conveyed by XML schemas may be found below in the description of FIGS. 4a, 4c, and 5a.

As described earlier, encoder 106 may obtain knowledge of the data 204 in a plurality of ways. In some embodiments, knowledge of the data 204 may be pre-provided to encoder 106 by a user of the computer system or systems executing the encoder 106. The knowledge may be uploaded into computer system memory through a network interface or read from a storage medium. In such embodiments, no further analysis is needed and the knowledge of the data may simply be compiled into the knowledge representation, which may include one or more finite automata.

In other embodiments, encoder 106 or a related process may derive knowledge of the data 204. In various embodiments, encoder 106 may make a first pass through of data 202, deriving the structure of the data and creating knowledge of the data 204. In other embodiments, encoder 106 may derive knowledge of the data 204 concurrently with processing the data 202. In yet other embodiments, application 104 may provide encoder 106 with only a portion of data 202. The portion provided may be determined by one or more of a query, a path expression, a transformation, a set of changes to the data, a script, and a software program, or may be selected from the data 202 in some other fashion, including at random. Once a portion of data 202 is selected for analysis, encoder 106 may either make an initial pass through of data 202, deriving the structure of the data and creating knowledge of the data 204, or may derive knowledge of the data 204 concurrently with processing the data 202. In other embodiments, encoder or some external process may derive the knowledge for encoding arbitrary subsets of the data that may be provided by an application in advance. In one embodiment, the knowledge used for encoding arbitrary subsets of the data may include a Finite Automaton that accepts a sequence of zero or more data items selected from the data. In a number of embodiments, data 202 may deviate from knowledge of the data 204, such as when knowledge of data is incomplete, inaccurate or when only a portion of data 202 is analyzed, such as when analysis of data 202 is concurrent with the encoder 106's processing of data 202. In such embodiments, encoder 106 may be adapted to represent these deviations from knowledge of the data 204 as a part of the encoded values.

In other embodiments, knowledge of the data is not received or derived by encoder 106, but is instead compiled on a separate system or by a separate process into representations of knowledge 206, which may include one or more finite automata. Representations of knowledge 206 may then be provided directly to encoder 106, obviating the need for encoder 106 to receive or derive knowledge of data 204. In one embodiment, the representations of knowledge 206 may be provided in XML format. In one embodiment, the representations of knowledge 206 may be encoded by an encoder 106 of the current invention running on the same system or a separate system. As such, decoder 112 may be used to decode both encoding values 210 and knowledge representation 206.

Figure 4D:
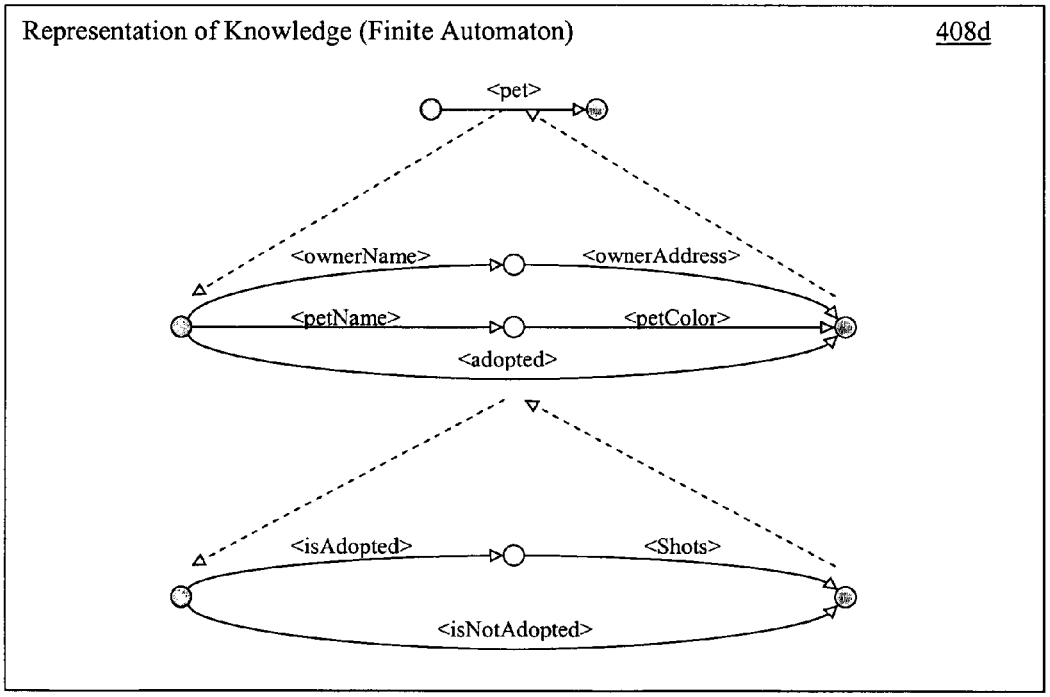

As is further illustrated, once knowledge of the data 204 is received or derived, encoder 106 or a related process (such as the knowledge representation compiling process described above) may represent knowledge of the data 204 as one or more finite automata 206. The finite automata may be deterministic or non-deterministic, and may, in some embodiments, comprise a nested structure. In various embodiments, the finite automata 206 may comprise data structures or objects of a programming language (e.g., C++ objects) have a plurality of "nodes," each node specifying a node or nodes that may follow the current node. FIG. 4b illustrates an example including a first finite automaton with a second nested finite automaton. The first finite automaton accepts a <note> element. The second, nested finite automaton accepts the contents of the <note> element, which includes a <to> element followed by a <from> element followed by a <heading> element followed by a <body> element. Additional nested finite automaton (not shown) might also exist that accept the string contents of the <to> element, <from> element, among others. Each finite automaton may have one or more start states and one or more end states, each end state having no out going transitions to other nodes. Some finite automata may have one or more nodes that each has a plurality of out going transitions to possible next nodes. FIG. 4d illustrates another example including a first finite automaton, which has a second nested finite automaton, which has a third nested finite automaton. In that example, the first finite automaton includes a single transition that accepts the "<pet>" element. The second, nested finite automaton accepts the contents of the "<pet>" element, which may start with any one of "<ownerName>," "<petName>," and "<adopted>." The third finite automaton accepts the contents of the "<adopted>" element, which may start with "<isAdopted>" or "<isNotAdopted>."

As discussed above, in some embodiments, a transition or transitions of a finite automaton may contain references to other "nested" finite automata. For example, the transition "<note>" of a first finite automata shown in FIG. 4b, representing the structure of an XML document, contains a reference to a second finite automata representing the contents of the <note> element. The nesting of finite automata is further illustrated and discussed in FIG. 6.

Continuing to refer to FIG. 2, in some embodiments, nodes of the finite automata 206 may include an "anything here" or "wildcard" transition (further illustrated in FIG. 5c) that match any data not described by other outgoing transitions from that node to handle data 202 that deviates from the knowledge of the data 204.

As mentioned above, data 202 may deviate from the structure or content described by knowledge of the data 204, in some embodiments. As the encoder 106 processes data 202 to determine and generate lower entropy encoding values 210, encoder 106 may encounter portions of data 202 that are not described by knowledge of the data 204. In one embodiment, such "deviant" data 202 that are not described by knowledge of the data 204 may match a wildcard transition in a finite automaton. In one embodiment, when data matches a wildcard transition, encoder 106 or a related process may augment finite automata 206 by adding a new transition to match future instances of the deviant data directly without the use of the wildcard. Thus, the next time the same data 202 is encountered, it will match the newly added transition instead of the wildcard transition allowing encoder 106 to encode "deviant" data more efficiently. This may be accomplished, in various embodiments, by adding an additional transition to the node from which the wildcard transition matching deviant data 202 originated, the transition being in addition to the wildcard transition. In addition, encoder 106 or a related process may add a new nested finite automaton to represent the content of the deviant data. In one embodiment, the newly added nested finite automaton includes a start state with an outgoing wildcard transition pointing back to the start state.

FIGS. 5a-5c illustrate an example. In this example, the knowledge of the data in FIG. 5a is a schema fragment describing a "<note>" element containing a "<to>" element followed by a "<from>" element followed by a "<heading>" element followed by a "<body>" element. However, the XML data 202 received in FIG. 5b has a "<date>" element following the "<heading>" element that is not described by the knowledge of data in FIG. 5a. Many of the nodes in FIG. 5c have outgoing wildcard transitions marked by * symbols in the figure. The deviant "<date>" element shown in FIG. 5b will first match the wildcard transition on the node pointed to by the "<heading>" transition causing the finite automaton to accept the deviant data. Accordingly, when the "<date>" element matches the wildcard transition encoder 106 or a related process may augment finite automata 206 by adding a third possible transition to the node pointed to by the "<heading>" transition, which will match future instances of the "<date>" element directly without the use of the wildcard. Thus, the finite automaton illustrated in FIG. 5c illustrates the augmented finite automaton, in which the "<heading>" element may be followed by a "<date>" element, a "<body>" element or anything else that matches the wildcard transition. The first time the deviant data 202 is encountered, it will match the "wildcard" transition. Encoder 106 may then generate encoding values 210 representing the wildcard transition followed by encoding values describing the deviant data (e.g., the type, name and possibly other information about the deviant data). However, because of the representation enhancements for deviations described above, the next time deviant data 202 is encountered, encoder 106 may generate an encoding value 210 representing the "<date>" transition and need not generate additional encoding values to represent the deviant data a second time (e.g., the type, name or other information about the deviant data).

Referring to FIG. 2 again, encoder 106 or a related process may create the one or more finite automata by compiling knowledge of the data 204. For example, Xerces, the open source Apache™ XML Parser parses schemas and creates finite automata for the schemas to aid in validation. Such finite automata may be the finite automata utilized by encoder 106 to represent data 202 as lower entropy values 210. As mentioned above, a process or system separate from encoder 106 may instead compile knowledge of the data 204, and provide the compiled knowledge representation 206 to encoder 106.

As shown, an encoding value generation process 208 of encoder 106 may determine and generate smaller and more uniform, lower entropy encoding values 210 representing corresponding data 202, the determining based at least in part on the knowledge representation of data 202, which may include one or more finite automata 206. The finite automata 206 may facilitate representation of a large number of structural elements of data 202 in a small number of bit sequence values based on the location of the structural elements within a finite automaton 206. In FIG. 4*d* "<pet>" may contain "<ownerName>," "<petName>," or "<adopted>." Given that one of the three elements must appear in the content of "<pet>," only three distinct encoded values are required to represent the three elements (e.g., 0, 1 and 2). In one embodiment, any of these three values may be represented by at most two bits. "<ownerName>" may be represented by "00", "<petName>" my be represented by "01", and "<adopted>" may be represented by "10." Another node, not shown, may be followed by four possible transitions, which may be represented by four distinct values (e.g., 0, 1, 2 and 3). In one embodiment, the first of these transitions may be represented by the value 0. The first of these transitions does not need to have any correspondence or relation to "<ownerName>," but both may nonetheless be represented by the same value (i.e, 0). Thus, encoder 106 may use knowledge representation 206 to map a sequence of unrelated higher entropy data 204 to a sequence of lower entropy identical or overlapping values. In one embodiment encoder 106 may apply compression algorithms, such as Lempel-Zip, Huffman or Deflate, to the sequence of lower entropy identical or overlapping encoding values to generate a smaller set of encoding values 210 than if encoder 106 had applied said compression algorithms to original sequence of unrelated higher entropy data 204. In other embodiments, encoder 106 may encode each value independently using fixed or variable length codes. For example, encoder 106 may use a 2 bit fixed width code to represent one of four distinct values. In other embodiments, encoder 106 may choose a more optimal variable length code that represents higher probability values in fewer bits than lower probability values (e.g., using Huffman or arithmetic coding). If a given node is followed by only a single out-going transition, the data represented by the transition may be represented by zero bits, or—in other words—represented by no encoding value.

Encoding value generation process 208 may, in some embodiments, determine the above values representing data 202 and/or the encoding values 210 that represent said values by traversing the finite automata 206 as it processes data 202. For example, if finite automata 206 have been created prior to processing data 202, process 208 may traverse the automata 206 concurrently with reading 202, and upon finding data 202 matches one of three possible transitions of a previous node, may represent the data 202 as one of three possible values (e.g., 0, 1, 2). Upon determining a value to represent data 202, encoder 106 may use a fixed 2 bit sequence to represent the value, use a more optimal encoding based on the probabilities of the three possible values (e.g., Huffman or arithmetic coding) or determine encoding values 210 for said value by one or more of applying a compression algorithm to the sequence of values.

Additionally, one or more encoding algorithms, such as compression algorithms like Huffman and Lempel-Ziv may be associated with one or more of the represented data types or structures, and may facilitate encoder 106 in reducing the entropy of encoding values even further. Such algorithms, however, are well known in the art and need not be described further.

In some embodiments, encoding values 210 may have a different ordering than corresponding portions of data 202. For example, all encoding values for portions of data 202 that are of type string may be represented together, and all encoding values 210 of portions of data 202 that are of type integer may be represented together and follow the strings. In another example, encoding values 210 for portions of data 202 may be grouped by element/attribute name instead, and represented together in such groups. This may be facilitated by an algorithm of process 208, and may be done to further facilitate a compression algorithm such as Huffman or Lempel-Ziv.

Also, in various embodiments, values representing the algorithms used in encoding and/or the knowledge of the data 204 may further be added to encoding values 210, although the algorithms themselves need not be encoded. Further, the values 210 may also represent any parameters that may have influenced the determining or generation of encoding values.

Upon generating encoding values 210, encoder 106 may send the values 210 to a decoder 112 over a networking fabric 110. In other embodiments, a user of the computer system having encoder 106 may write the values 210 onto a storage medium for later decoding on the same computer and/or transfer the to a computer system having decoder 112 via the storage medium.

FIG. 3 illustrates a flow chart view of selected operations for representing received data as encoded values, facilitated by one or more knowledge representations such as finite automata, in accordance with various embodiments. As shown, for the embodiment, API 104 receives data from one or more application or system processes 102, block 302. The data may be any sequence of zero, one, or more bits, and may or may not have a structure. In various embodiments, data is structured as XML data, character data, data from a database, structures defined by a programming language, and/or structures defined by an IDL. Further, data items contained within data may be provided to encoder 106 via API 104 as one or more of the data types integer, long, short, byte, string, date, Boolean, float, double, qualified name, byte array, and/or typed list. In some embodiments, knowledge of the received data (discussed more below) may facilitate automatic conversion of typed data items of data from their provided types to another data type or types determined by the knowledge of the data.

In various embodiments, encoder 106 then receives the data from API 104, block 304. API 104 may represent any sort of API known in the art, and may be implemented as a separate process or processes, or may form an executing layer of the encoder 106 process. Additionally, API 104 may be implemented on the same computer system as encoder 106 or on a separate computer system, in some embodiments connected by a network. In other embodiments, API 104 and encoder 106 may execute as separate processes on unconnected computer systems, and may require a user or users of the system to transfer the provided data. API 104 may also conform to one or more of the XML DOM, Simple API for XML (SAX), Streaming API for XML (StAX), and Java API for XML Binding (JAXB). In some embodiments, encoder 106 may receive data directly from application or system processes 102, without use of API 104.

As is further illustrated, encoder 106 may obtain knowledge of the data by receiving the knowledge, block 306, deriving the knowledge, block 308, or performing some combination of these operations. In some embodiments, the knowledge of the data may be pre-provided to/received by encoder 106 by a user of the computer system or systems executing the encoder 106 or other systems, block 306. The knowledge may be uploaded into computer system memory through a network interface or read from a storage medium. In such embodiments, no further analysis is needed and the knowledge of the data may simply be compiled and represented by one or more finite automata. Further explanation of various implementations of the knowledge of the data may be found above.

In other embodiments, when the knowledge of the data is not pre-provided or fully provided, encoder 106 or a related process may derive the knowledge of the data, block 308. In various embodiments, encoder 106 may make a first pass through of the data, deriving the structure of the data and creating the knowledge of the data. In some embodiments, encoder 106 may derive the knowledge of the data concurrently with processing the data. In yet other embodiments, encoder 106 may analyze only a portion of the data. The portion provided may be determined by one or more of a query, a path expression, a transformation, a set of changes to the data, a script, and a software program, or may be selected from the data in some other fashion, including at random. Once a portion of the data is selected for analysis, encoder 106 may either make an initial pass through the data, deriving the structure of the data and creating the knowledge of the data, or may derive the knowledge of the data concurrently with processing the data. In other embodiments, encoder 106 or some external process may derive knowledge for encoding arbitrary subsets of the data that may be provided by an application in advance. In one embodiment, the knowledge used for encoding arbitrary subsets of the data may include a finite automaton that accepts a sequence of zero or more data items selected from the data. In one embodiment, said finite automaton may have a start node with a separate out-going transition for data items defined in knowledge of data 204. The transitions may, in turn, point back to said start node. In a number of embodiments, the data may deviate from the knowledge of the data, such as when knowledge of the data is incomplete, inaccurate, or when only a portion of the data is analyzed, or such as when analysis of the data is concurrent with the encoder 106's processing of the data. In such embodiments, encoder 106 may be adapted to represent these deviations from knowledge of the data as a part of the encoded values. In addition, encoder 106 may modify knowledge of the data to incorporate knowledge of deviations encountered, for example by modifying and/or adding one or more finite automata representing the knowledge of the deviations.

In other embodiments, knowledge of the data is not received or derived by the encoder 106, but is instead compiled on a separate system or by a separate process into representations of knowledge, which may include one or more finite automata. Representations of knowledge may then be provided directly to the encoder 106, obviating the need for the encoder to receive or process knowledge of data. In on embodiment, the representations of knowledge may be provided in XML format. In one embodiment, the representations of knowledge may be encoded by an encoder 106 of the current invention running on the same system or a separate system. As such, a decoder may be used to decode both encoding values and knowledge representations. Thus, FIG. 3 illustrates the option of skipping the receipt/derivation of knowledge of the data and of compiling that knowledge by the encoder 106, allowing the encoder 106 receiving representations of knowledge from another computer to transition from the operation of receiving the data, block 304 to the operation of determining values representing the data, block 312.

As is further illustrated, once the knowledge of the data is received or derived, encoder 106 or a related process may represent knowledge of the data as one or more finite automata, block 310. The finite automata may be deterministic or non-deterministic, and may, in some embodiments, comprise a nested structure. In various embodiments, the finite automata may comprise data structures or objects of a programming language (e.g., C++ objects) have a plurality of "nodes," each node specifying a node or nodes that may follow the current node. FIG. 4d illustrates an example including a first finite automaton, which has a second nested finite automaton, which has a third nested finite automaton. In that example, the first finite automaton includes a single transition that accepts the "<pet>" element. The second, nested finite automaton accepts the contents of the "<pet>" element, which may start with any one of "<ownerName>," "<petName>," and "<adopted>." The third finite automaton accepts the contents of the "<adopted>" element, which may start with "<isAdopted>" or "<isNotAdopted>."

As discussed above, in some embodiments, a transition or transitions of a finite automaton may contain references to other "nested" finite automata. FIG. 4b illustrates an example including a first finite automaton with a second nested finite automaton. The first finite automaton accepts a <note> element. The second, nested finite automaton accepts the contents of the <note> element, which includes a <to> element followed by a <from> element followed by a <heading> element followed by a <body> element. Additional nested finite automaton (not shown) might also exist that accept the string contents of the <to> element, <from> element, and others. The nesting of finite automata is further illustrated and discussed in FIG. 6.

Further, in some embodiments, nodes of the finite automata may include an "anything here" or "wildcard" transition (further illustrated in FIG. 5c) that match any data not described by other outgoing transitions from that node to handle data that deviates from the knowledge of the data.

Referring to FIG. 3 again, as mentioned above, the data may deviate from the structure or content described by the knowledge of the data, in some embodiments. As the encoder 106 processes the data to determine and generate lower entropy encoding values, encoder 106 may encounter portions of the data that are not described by a part of the knowledge of the data. In one embodiment, such "deviant" data that are not described by the knowledge of the data may match a wildcard transition in a finite automaton. In one embodiment, when data matches a wildcard transition, encoder 106 or a related process may augment the finite automata by adding a new transition to match future instances of the deviant data directly without the use of the wildcard. Thus, the next time the same data is encountered, it will match the newly added transition instead of the wildcard transition allowing the encoder to encode "deviant" data more efficiently. This may be accomplished, in various embodiments, by adding an additional transition to the node from which the wildcard transition matching the deviant data originated, the transition being in addition to the wildcard transition. In addition, the encoder or a related process may add a new nested finite automaton to represent the content of the deviant data. In one embodiment, the newly added nested finite automaton includes a start state with an outgoing wildcard transition pointing back to the start state.

FIGS. 5a-5c illustrate an example. In this example, the knowledge of the data in FIG. 5a is a schema fragment describing a "<note>" element containing a "<to>" element followed by a "<from>" element followed by a "<heading>" element followed by a "<body>" element. However, the XML data received in FIG. 5b has a "<date>" element following the "<heading>" element that is not described by the knowledge of data in FIG. 5a. Many of the nodes in FIG. 5c have outgoing wildcard transitions marked by * symbols in the figure. The deviant "<date>" element shown in FIG. 5b will first match the wildcard transition on the node pointed to by the "<heading>" transition causing the finite automaton to accept the deviant data. Accordingly, when the "<date>" element matches the wildcard transition encoder 106 or a related process may augment the finite automata by adding a third possible transition to the node pointed to by the "<heading>" transition, which will match future instances of the "<date>" element directly without the use of the wildcard. Thus, the finite automaton illustrated in FIG. 5c illustrates the augmented finite automaton, in which the "<heading>" element may be followed by a "<date>" element, a "<body>" element or anything else that matches the wildcard transition. The first time the deviant data is encountered, it will match the "wildcard" transition. Encoder 106 may then generate encoding values representing the wildcard transition followed by encoding values describing the deviant data (e.g., the type, name and possibly other information about the deviant data). However, because of the representation enhancements for deviations described above, the next time the deviant data is encountered, encoder 106 may generate an encoding value representing the "<date>" transition and need not generate additional encoding values to represent the deviant data a second time (e.g., the type, name or other information about the deviant data).

Encoder 106 or a related process may create the one or more finite automata by compiling the knowledge of the data. For example, Xerces, the open source Apache™ XML Parser parses schemas and creates finite automata for the schemas to aid in validation. Such finite automata may be the finite automata utilized by encoder 106 to represent data as lower entropy values.

As shown, an encoding value generation process of encoder 106 may determine and generate smaller and more uniform, lower entropy encoding values representing corresponding data, the determining based at least in part on the knowledge representation of data, which may include one or more finite automata. The finite automata may facilitate representation of a large number of structural elements of data in a small number of bit sequence values based on the location of the structural elements within a finite automaton. In FIG. 4d "<pet>" may contain "<ownerName>," "<petName>," or "<adopted>." Given that one of the three elements must appear in the content of "<pet>," only three distinct encoded values are required to represent the three elements (e.g., 0, 1 and 2). In one embodiment, any of these three values may be represented by at most two bits. "<ownerName>" may be represented by "00", "<petName>" my be represented by "01", and "<adopted>" may be represented by "10." Another node, not shown, may be followed by four possible transitions, which may be represented by four distinct values (e.g., 0, 1, 2 and 3). In one embodiment, the first of these transitions may be represented by the value 0. The first of these transitions does not need to have any correspondence or relation to "<ownerName>," but both may nonetheless be represented by the same value (i.e, 0). Thus, encoder 106 may use the knowledge representation to map a sequence of unrelated higher entropy data to a sequence of lower entropy identical or overlapping values. In one embodiment encoder 106 may apply compression algorithms, such as Lempel-Zip, Huffman or Deflate, to the sequence of lower entropy identical or overlapping encoding values to generate a smaller set of encoding values than if encoder 106 had applied said compression algorithms to original sequence of unrelated higher entropy data. In other embodiments, encoder 106 may encode each value independently using fixed or variable length codes. For example, encoder 106 may use a 2 bit fixed width code to represent one of four distinct values. In other embodiments, encoder 106 may choose a more optimal variable length code that represents higher probability values in fewer bits than lower probability values (e.g., using Huffman or arithmetic coding). If a given node is followed by only a single out-going transition, the data represented by the transition may be represented by zero bits, or —in other words— represented by no encoding value.

Referring to FIG. 3 again, the determining, block 312, may, in some embodiments, be facilitated by traversing the finite automata as the encoder processes the data. For example, if the finite automata have been created prior to processing the data, encoder 106 may traverse the automata concurrently with reading the data, and upon finding that the data matches one of three possible transitions of a previous node, may represent the data as one of three possible values (e.g., 0, 1, 2). Upon determining a value to represent the data, encoder 106 may use a fixed 2 bit sequence to represent the value, use a more optimal encoding based on the probabilities of the three possible values (e.g., Huffman or arithmetic coding) or determine encoding values for said value by one or more of applying a compression algorithm to the sequence of values.

Also, in various embodiments, values representing the knowledge of the data may further be added to the encoding values, block 316, although such values need not be encoded.

Upon generating the encoding values, encoder 106 may send the values to a decoder 112 over a networking fabric 110, block 318. In other embodiments, a user of the computer system having encoder 106 may write the values onto a storage medium and manually transfer the values to a computer system having decoder 112 via the storage medium.

FIGS. 4a-4d illustrate exemplary schemas providing knowledge of the received data, and finite automata representing those schemas, in accordance with various embodiments of the invention.

As alluded to earlier, FIG. 4a illustrates an XML Schema Fragment, Knowledge of the data 402a. Knowledge of the data 402a does not illustrate a complete schema document, but rather a sequence and structure of schema elements. Schemas may comprise simple elements, which are elements that may only comprise text or numbers, and complex elements, which may comprise other elements. As shown, 402a contains one complex element, "<note>," and four simple elements. The four simple elements are contained within a "<xs: sequence>" element, which requires its child elements to all be present and to be in the specified order. Thus, XML data conforming to knowledge of the data 402a will have a note element, containing "<to>," "<from>," "<heading>," and "<body>" elements in sequence. Any of the elements contained in "<note>" may have content of the data type "string."

In various embodiments, the knowledge of the data is derived from the received XML data by analysis of the data or a portion of the data. If all of the data has been analyzed, there will be no deviations from the derived knowledge of the data, and all received data will fit the description provided by the knowledge of the data. If, however, only a portion of the data is analyzed by encoder 106, or encoder 106 receives knowledge of the data 402a in some other fashion, such as having knowledge 402a pre-provided, XML data received by encoder 106 may not conform to knowledge of the data 402a. When this eventuality is encountered, encoder 106 handles it in the manner illustrated by FIG. 5a-5c.

FIG. 4b illustrates an example 404b representing knowledge of the data 402a, including a first finite automaton with a second nested finite automaton. As described above, compiling knowledge of the data 402a may generate finite automata 404b. Finite automata 404b represent the structure of received data, here corresponding to knowledge of the data 402a. Also, the finite automata may be deterministic or non-deterministic, and may, in some embodiments such as those illustrated here, comprise a nested structure. In various embodiments, finite automata 404b may comprise data structures or objects of a programming language (e.g., C++ objects) having a plurality of "nodes," each node specifying a next node or nodes that may follow. Thus, the first finite automaton accepts a "<note>" element. The second, nested finite automaton accepts the contents of the "<note>" element, which includes a <to> element followed by a <from> element followed by a <heading> element followed by a <body> element. Additional nested finite automaton (not shown) might also exist that accept the string contents of the <to> element, <from> element, among others. Each finite automaton may have one or more start states and one or more end states, each end state having no out going transitions to other nodes. Some finite automata may have one or more nodes that each has a plurality of out going transitions to possible next nodes.

FIG. 4c illustrates an XML Schema Fragment, Knowledge of the data 406c. Knowledge of the data 406c does not illustrate a complete schema document, but rather a sequence and structure of schema elements. As shown, 406c contains two complex elements, "<pet>" and "<adopted>," three groups of elements, such as "ownergroup," and seven simple elements. An element group allows a schema to separately declare and later refer to a sequence of elements. Also shown as part of knowledge of the data 406c is the <xs:choice> element, which specifies one or more elements, any of which may follow the complex element in which they are declared.

In various embodiments, knowledge of the data 406c is derived from the received XML data by analysis of the data or a portion of the data. If all of the data has been analyzed, there will be no deviations from the schema, and all received data will fit the description provided by the schema. If, however, only a portion of the data is analyzed by encoder 106, or encoder 106 receives knowledge of the data 406c in some other fashion, such as having knowledge 406c pre-provided, XML data received by encoder 106 may not conform to knowledge of the data 406c. When this eventuality is encountered, encoder 106 handles it in the manner illustrated by FIG. 5a-5c.

FIG. 4d illustrates finite automata 408d representing knowledge of the data 406c, including a first finite automaton, which has a second nested finite automaton, which has a third nested finite automaton. As described above, compiling knowledge of the data 406c may generate finite automata 408d. Finite automata 408d represent the structure of received data, here corresponding to knowledge of the data 406c. Also, the finite automata may be deterministic or non-deterministic, and may, in some embodiments, comprise a nested structure. In various embodiments, finite automata 408d may comprise data structures or objects of a programming language (e.g., C++ objects) having a plurality of "nodes," each node specifying a next node or nodes that may follow. Thus, the first finite automaton includes a single transition that accepts the "<pet>" element. The second, nested finite automaton accepts the contents of the "<pet>" element, which may start with any one of "<ownerName>," "<petName>," and "<adopted>." The third finite automaton accepts the contents of the "<adopted>" element, which may start with "<isAdopted>" or "<isNotAdopted>." Each finite automaton may have one or more start states and one or more end states, each end state having no out going transitions to other nodes.

As alluded to earlier, FIGS. 5a-5c illustrate an exemplary schema providing knowledge of the received data, received XML data having deviations from the knowledge of the data, and a finite automaton representing both the knowledge of the data and deviations from the knowledge of the data, in accordance with various embodiments of the invention.

FIG. 5a illustrates an XML Schema Fragment, Knowledge of the data 502a. Knowledge of the data 502a does not illustrate a complete schema document, but rather a sequence and structure of schema elements. As shown, 502a contains one complex element, "note," and four simple elements. Thus, XML data conforming to knowledge of the data 502a will have a "<note>" element containing a "<to>" element followed by a "<from>" element followed by a "<heading>" element followed by a "<body>" element. Any of the elements after note may have content of the data type "string."

FIG. 5b illustrates an XML data fragment 504b deviating from the knowledge of the data 502a. Data 504b has a "<note>" element, followed by "<to>," "<from>," and "<heading>," elements in sequence. However, instead of having "<body>" directly follow "<heading>," as specified by the knowledge of the data 502a, data 504b specifies a "<date>" element between "<heading>" and "<body>." In all other aspects, however, data 504b conforms to knowledge of the data 502a.

FIG. 5c illustrates finite automata 506c representing knowledge of the data 502a and the deviation from the schema found in data 504b. Many of the nodes in FIG. 5c have outgoing wildcard transitions marked by * symbols in the figure. The deviant "<date>" element shown in FIG. 5b will first match the wildcard transition on the node pointed to by the "<heading>" transition causing the finite automaton to accept the deviant data. Accordingly, when the "<date>" element matches the wildcard transition encoder 106 or a related process may augment the finite automata by adding a third possible transition to the node pointed to by the "<heading>" transition, which will match future instances of the "<date>" element directly without the use of the wildcard. Thus, the finite automaton illustrated in FIG. 5c illustrates the augmented finite automaton, in which the "<heading>" element may be followed by a "<date>" element, a "<body>" element or anything else that matches the wildcard transition. The first time the deviant data 504b is encountered, it will match the "wildcard" transition. Encoder 106 may then generate encoding values representing the wildcard transition followed by encoding values describing the deviant data (e.g., the type, name and possibly other information about the deviant data). However, because of the representation enhancements for deviations described above, the next time deviant data is encountered, encoder 106 may generate an encoding value representing the "<date>" transition and need not generate additional encoding values to represent the deviant data a second time (e.g., the type, name or other information about the deviant data).

Figure 6:
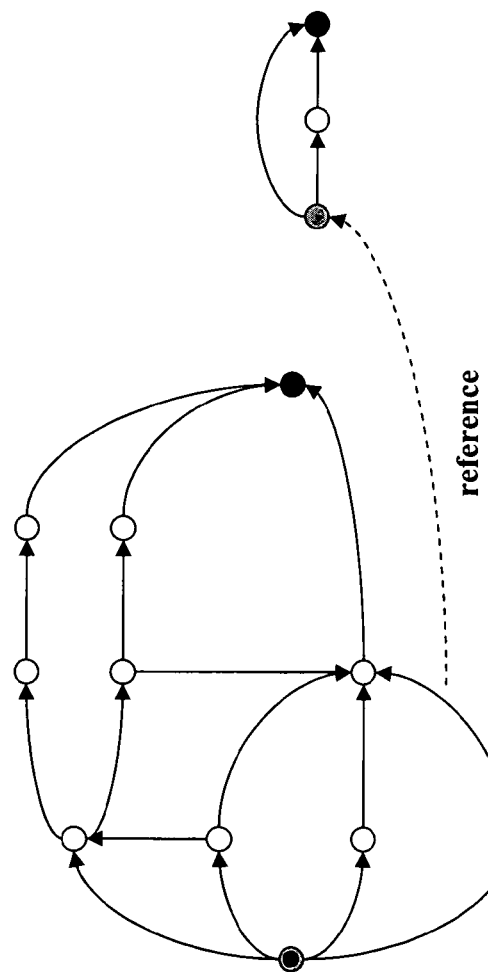
FIG. 6 illustrates exemplary, nested finite automata representing knowledge of the received data, in accordance with various embodiments of the invention.

FIG. 6 illustrates exemplary, nested finite automata representing knowledge of the received data, in accordance with various embodiments of the invention. As shown, a transition or transitions of a finite automaton may contain references to other "nested" finite automata. For example, a transition "<note>" of a finite automaton may contain a reference to another finite automaton representing an element of "<note>," such as "<to>." This might mean, for example, having the "<note>" transition reference a finite automaton for the "<to>" element. The implementation of the reference between finite automata may vary based on implementation. In some embodiments, where the automata are represented by C++ or Java objects, the reference may be a member variable of one finite automaton objects that acts as a pointer to another finite automaton object. Nesting of objects, however, is well known in the art and may be achieved in any number of ways, including the use of named references, such as XML element types.

FIG. 7 illustrates in more detail selected aspects of a decoder of the invention, in accordance with various embodiments. Decoder 112 may be implemented as one or more processes, such as data determination and generation process 708, capable of receiving encoded values 702, receiving or deriving knowledge of the data 704 corresponding to the encoded values 702, which may include one or more finite automata 706, determining the data 710 corresponding to the encoded values 702, based at least in part on the knowledge representation, and generating the determined data 710. The processes of the decoder may all be implemented on one computer system or on several, as a distributed process or processes on several computer systems of a network.

In various embodiments, decoder 112 may receive the encoded values 702 from another computer system having encoder 106 via a networking fabric such as networking fabric 110. Decoder 112 may also have encoded values 702 provided by a user via a storage medium. The encoded values 702 received by decoder 112 may comprise unique sequences of zero, one, or more bits correspondingly representing data, and in some embodiments comprise a sequence of bytes. As described above, the sequence of bits chosen to represent various types and structures of data, such as XML elements, may be determined at least in part based on the knowledge representation of the data, such as one or more finite automata 706. Further, encoded values 702 may further comprise values representing knowledge of the data 704, algorithms used to encode the data, and/or parameters used in encoding the data (the latter two, though part of the data received by the decoder 112, may or may not be encoded).

As illustrated, knowledge of the data 704 may be any sort of structure or grammar describing the content and relationships of data known in the art. Knowledge of the data 704 may include regular expressions, database schemas, schema languages, programming languages, and/or IDLs. Specific examples include the XML Schema Language (as shown in the schema fragments of FIGS. 4a, 4c, and 5a), the RelaxNG schema language, the XML DTD language, BNF, extended BNF, Java, C, C++, C#, and CORBA. A more detailed description of knowledge of the data 704 as conveyed by XML schemas may be found above in the description of FIGS. 4a, 4c, and 5a.

Referring to FIG. 7 again, decoder 112 may obtain knowledge of the data 704 in a plurality of ways. In some embodiments, knowledge of the data 704 may be pre-provided to decoder 112 by a user of the computer system or systems executing the decoder 112. The knowledge may be uploaded into computer system memory through a network interface or read from a storage medium. In such embodiments, no further analysis is needed and the knowledge of the data may simply be compiled into the knowledge representation, which may include one or more finite automata.

In other embodiments, when knowledge of the data 704 is not pre-provided, decoder 112 or a related process may derive knowledge of the data 704. In various embodiments, decoder 112 may make a first pass through of encoding values 702. If encoded values 702 include a plurality of values representing knowledge of the data 704, decoder 112 may use the values to generate the corresponding knowledge of the data 704. In other embodiments, decoder 112 may derive knowledge of the data 704 concurrently with processing the encoded values 702. In a number of embodiments, encoded values 702 may represent data that deviates from knowledge of the data 704. In such embodiments, decoder 112 may be adapted to represent these deviations from knowledge of the data 704 as a part of the one or more finite automata 706 representing knowledge of the data 704, this process described in greater detail below.

In other embodiments, knowledge of the data 704 is not received or derived by decoder 112, but is instead compiled on a separate system or by a separate process into representations of knowledge 706, which may include one or more finite automata. Representations of knowledge 706 may then be provided directly to decoder 112, obviating the need for decoder 112 to receive or derive knowledge of data 704. In one embodiment, the representations of knowledge 706 may be provided in XML format. In one embodiment, the representations of knowledge 706 may be encoded by an encoder 106 of the current invention running on the same system or a separate system. As such, decoder 112 may be used to decode both encoded values 702 and knowledge representation 706.

As is further illustrated, once knowledge of the data 704 is received or derived, decoder 112 or a related process (such as the knowledge representation compiling process described above) may represent knowledge of the data 704 as one or more finite automata 706. The finite automata may be deterministic or non-deterministic, and may, in some embodiments, comprise a nested structure. In various embodiments, the finite automata 706 may comprise data structures or objects of a programming language (e.g., C++ objects) have a plurality of "nodes," each node specifying a node or nodes that may follow the current node. FIG. 4b illustrates an example including a first finite automaton with a second nested finite automaton. The first finite automaton accepts a <note> element. The second, nested finite automaton accepts the contents of the <note> element, which includes a <to> element followed by a <from> element followed by a <heading> element followed by a <body> element. Additional nested finite automaton (not shown) might also exist that accept the string contents of the <to> element, <from> element, among others. Each finite automaton may have one or more start states and one or more end states, each end state having no out going transitions to other nodes. Some finite automata may have one or more nodes that each has a plurality of out going transitions to possible next nodes. FIG. 4d illustrates another example including a first finite automaton, which has a second nested finite automaton, which has a third nested finite automaton. In that example, the first finite automaton includes a single transition that accepts the "<pet>" element. The second, nested finite automaton accepts the contents of the "<pet>" element, which may start with any one of "<ownerName>," "<petName>," and "<adopted>." The third finite automaton accepts the contents of the "<adopted>" element, which may start with "<isAdopted>" or "<isNotAdopted>."

As discussed above, in some embodiments, a transition or transitions of a finite automaton may contain references to other "nested" finite automata. For example, the transition "<note>" of the finite automata shown in FIG. 4b, representing the structure of an XML document, contains a reference to a second finite automata representing the contents of the <note> element. The nesting of finite automata is further illustrated and discussed in FIG. 6.

Referring to FIG. 7 again, in some embodiments, nodes of the finite automata 706 may include an "anything here" or "wildcard" transition (further illustrated in FIG. 5c) that match any data not described by other outgoing transitions from that node to handle data represented by encoding values 702 that deviates from the knowledge of the data 704.

As mentioned above, data represented by values 702 may deviate from the structure or content described by knowledge of the data 704, in some embodiments. As the decoder 112 processes values 702 to determine the data 710 represented by the lower entropy encoding values 702, decoder 112 may encounter portions of data represented by values 702 that are not described by knowledge of the data 704. In one embodiment, such "deviant" data 710 that are not described by knowledge of the data 704 may match a wildcard transition in a finite automaton. In one embodiment, when data matches a wildcard transition, decoder 112 or a related process may augment finite automata 706 by adding a new transition to match future instances of the deviant data directly without the use of the wildcard. Thus, the next time the same data 710 represented by values 702 is encountered, it will match the newly added transition instead of the wildcard transition allowing decoder 112 to decode "deviant" data more efficiently. This may be accomplished, in various embodiments, by adding an additional transition to the node from which the wildcard transition matching deviant data 710 originated, the transition being in addition to the wildcard transition. In addition, decoder 112 or a related process may add a new nested finite automaton to represent the content of the deviant data. In one embodiment, the newly added nested finite automaton includes a start state with an outgoing wildcard transition pointing back to the start state.

FIGS. 5a-5c illustrate an example. In this example, the knowledge of the data in FIG. 5a is a schema fragment describing a "<note>" element containing a "<to>" element followed by a "<from>" element followed by a "<heading>" element followed by a "<body>" element. However, the XML data 710 received in FIG. 5b has a "<date>" element following the "<heading>" element that is not described by the knowledge of data in FIG. 5a. Many of the nodes in FIG. 5c have outgoing wildcard transitions marked by * symbols in the figure. The deviant "<date>" element shown in FIG. 5b will first match the wildcard transition on the node pointed to by the "<heading>" transition causing the finite automaton to accept the deviant data. Accordingly, when the "<date>" element matches the wildcard transition decoder 112 or a related process may augment finite automata 706 by adding a third possible transition to the node pointed to by the "<heading>" transition, which will match future instances of the "<date>" element directly without the use of the wildcard. Thus, the finite automaton illustrated in FIG. 5c illustrates the augmented finite automaton, in which the "<heading>" element may be followed by a "<date>" element, a "<body>" element or anything else that matches the wildcard transition. The first time the deviant data 710 represented by values 702 is encountered, it will match the "wildcard" transition. Decoder 112 may then decode encoded values 702 representing the wildcard transition followed by encoding values describing the deviant data (e.g., the type, name and possibly other information about the deviant data).

Referring to FIG. 7 again, decoder 112 or a related process may create one or more finite automata 706 by compiling knowledge of the data 704. For example, Xerces, the open source Apache™ XML Parser parses schemas and creates finite automata for the schemas to aid in validation. Such finite automata may be the finite automata utilized by decoder 112.

As shown, a data determination and generation process 708 of decoder 112 may determine and generate data 710 corresponding to lower entropy encoding values 702, the determining based at least in part on the knowledge representation of data 710, which may include one or more finite automata 706. The finite automata 706 may facilitate representation of a large number of structural elements of data 710 in a small number of bit sequence values based on the location of the structural elements within a finite automaton 706. In FIG. 4d "<pet>" may contain "<ownerName>," "<petName>," or "<adopted>." Given that one of the three elements must appear in the content of "<pet>," only three distinct encoded values are required to represent the three elements (e.g., 0, 1 and 2). In one embodiment, any of these three values may be represented by at most two bits. "<ownerName>" may be represented by "00", "<petName>" my be represented by "01", and "<adopted>" may be represented by "10." Another node, not shown, may be followed by four possible transitions, which may be represented by four distinct values (e.g., 0, 1, 2 and 3). In one embodiment, the first of these transitions may be represented by the value 0. The first of these transitions does not need to have any correspondence or relation to "<ownerName>," but both may nonetheless be represented by the same value (i.e, 0). Thus, decoder 112 may use knowledge representation 706 to map a sequence of lower entropy identical or overlapping values 702 to a sequence of unrelated higher entropy data 710. In one embodiment, decoder 112 may decode each value independently using fixed or variable length codes. For example, decoder 112 may determine that a 2 bit fixed width code represents one of four distinct values. In other embodiments, decoder 112 may determine a more optimal variable length code that represents higher probability values in fewer bits than lower probability values (e.g., using Huffman or arithmetic coding). If a given node is followed by only a single out-going transition, the data represented by the transition may be represented by zero bits in the encoded values 702, or—in other words—represented by no encoding value.

Data determination and generation process 708 may, in some embodiments, determine the data represented by the above bit sequences, which may be the encoded values 702, by traversing the finite automata 706 as it processes values 702. For example, if finite automata 706 have been created prior to processing values 702, process 708 may traverse the automata 706 concurrently with reading values 702, and upon finding values 702 representing data 710 correspond to a given transition in the finite automata 706, may represent the values 702 as the data element 710 corresponding to the transition.

Additionally, one or more decoding algorithms, such as compression algorithms like Huffman and Lempel-Ziv may be associated with one or more of the represented data types or structures, and may facilitate decoder 112 in determining the data values encoded by the encoder 106 using the algorithms. Such algorithms, however, are well known in the art and need not be described further.

In some embodiments, encoded values 702 may have a different ordering than corresponding portions of data 710. For example, all encoding values 702 for portions of data 710 that are of type string may be represented together, and all encoded values 702 of portions of data 710 that are of type integer may be represented together and follow the strings. In another example, encoding values 210 for portions of data 202 may be grouped by element/attribute name instead, and represented together in such groups. This may be facilitated by an algorithm of process 708, and may be done to further facilitate a compression algorithm such as Huffman or Lempel-Ziv.

Upon determining the represented data 710, decoder 112 may generate the data 710. Data 710 may be any sequence of zero, one, or more bits, and may or may not have a structure. In various embodiments, data 710 is structured as XML data, character data, data from a database, structures defined by a programming language, and/or structures defined by an IDL. Further, data items specified by the structure of data 710 and contained within data 710 may be provided by decoder 112 as one or more of the data types integer, long, short, byte, string, date, Boolean, float, double, qualified name, byte array, and/or typed list. In some embodiments, knowledge of the received data 704 (discussed more above) may facilitate automatic conversion of typed data items of encoded values 702 to one or more requested types (e.g., types requested by an application via an API) from another data type or types determined by the knowledge of the data 704.

In various embodiments, decoder 112 provides data 710 to an API 114. API 114 may represent any sort of API known in the art, and may be implemented as a separate process or processes, or may form an executing layer of the decoder 112 process. Additionally, API 114 may be implemented on the same computer system as decoder 112 or on a separate computer system, in some embodiments connected by a network. In other embodiments, API 114 and decoder 112 may execute as separate processes on unconnected computer systems, and may require a user or users of the system to transfer the provided data. API 114 may also conform to one or more of the XML DOM, Simple API for XML (SAX), Streaming API for XML (StAX), and Java API for XML Binding (JAXB).

Further, as shown, one or more application or system processes 116 may directly access the data 710 from decoder 112, or may access the data 710 from the decoder 112 via an API 114, discussed above.

FIG. 8 illustrates a flow chart view of selected operations needed to determine data corresponding to encoded values, facilitated by one or more finite automata, in accordance with various embodiments. As shown, decoder 112 may receive the encoded values from another computer system having encoder 106 via a networking fabric such as networking fabric 110, block 802. Decoder 112 may also have the encoded values provided via a storage medium. The encoded values received by decoder 112 may comprise unique sequences of zero, one, or more bits correspondingly representing data. As described above, the sequence of bits chosen to represent various types and structures of data, such as XML elements, may be determined at least in part based on the knowledge representation of the data, which may include one or more finite automata. Further, the encoding values may further comprise values representing the knowledge of the data, algorithms used to encode the data, and/or parameters used in encoding the data (the latter two, though part of the data received by decoder 112, may or may not be encoded).

In various embodiments, decoder 112 may obtain the knowledge of the data by receiving the knowledge, block 804, deriving the knowledge, block 806, or some combination of both operations. The knowledge of the data may be pre-provided to/received by decoder 112 by a user of the computer system, systems executing the decoder 112, or other systems, block 804, or by the encoder 106 via a network or other media. The knowledge may be uploaded into computer system memory through a network interface or read from a storage medium. In such embodiments, no further analysis is needed and the knowledge of the data may simply be compiled into the knowledge representation, which may include one or more finite automata. Further description of the knowledge of the data itself may be found above.

In other embodiments, when the knowledge of the data is not pre-provided or fully provided, decoder 112 or a related process may derive the knowledge of the data, block 806. Decoder 112 may make a first pass through of the encoding values. If the encoding values include a plurality of values representing the knowledge of the data, decoder 112 may use the values to generate the corresponding knowledge of the data. In other embodiments, decoder 112 may derive the knowledge of the data concurrently with processing the encoding values. In a number of embodiments, the encoding values may represent data that deviates from the knowledge of the data. In such embodiments, decoder 112 may be adapted to represent these deviations from the knowledge of the data as a part of the one or more finite automata representing the knowledge of the data.

In other embodiments, knowledge of the data is not received or derived by the decoder 112, but is instead compiled on a separate system or by a separate process into representations of knowledge, which may include one or more finite automata. Representations of knowledge may then be provided directly to the decoder 112, obviating the need for the decoder 112 to receive or derive knowledge of data. In on embodiment, the representations of knowledge may be provided in XML format. In one embodiment, the representations of knowledge 706 may be encoded by an encoder 106 of the current invention running on the same system or a separate system. As such, decoder 112 may be used to decode both encoding values 702 and knowledge representation 706. Thus, FIG. 8 illustrates the option of skipping the receipt/derivation of knowledge of the data and of compiling that knowledge by the decoder 112, allowing the decoder 112 receiving representations of knowledge from another computer or process to transition from the operation of receiving the encoding values, block 802 to the operation of determining the data represented by the encoding values, block 810.

As is further illustrated, once the knowledge of the data has been received or derived, decoder 112 or a related process (such as the knowledge representation compiling process described above) may represent at least a portion of the knowledge of the data as one or more finite automata, block 808. The finite automata may be deterministic or non-deterministic, and may, in some embodiments, comprise a nested structure. In various embodiments, the finite automata may comprise data structures or objects of a programming language (e.g., C++ objects) have a plurality of "nodes," each node specifying a node or nodes that may follow the current node. FIG. 4b illustrates an example including a first finite automaton with a second nested finite automaton. The first finite automaton accepts a <note> element. The second, nested finite automaton accepts the contents of the <note> element, which includes a <to> element followed by a <from> element followed by a <heading> element followed by a <body> element. Additional nested finite automaton (not shown) might also exist that accept the string contents of the <to> element, <from> element, among others. Each finite automaton may have one or more start states and one or more end states, each end state having no out going transitions to other nodes. Some finite automata may have one or more nodes that each has a plurality of out going transitions to possible next nodes. FIG. 4d illustrates another example including a first finite automaton, which has a second nested finite automaton, which has a third nested finite automaton. In that example, the first finite automaton includes a single transition that accepts the "<pet>" element. The second, nested finite automaton accepts the contents of the "<pet>" element, which may start with any one of "<ownerName>," "<petName>," and "<adopted>." The third finite automaton accepts the contents of the "<adopted>" element, which may start with "<isAdopted>" or "<isNotAdopted>."

As discussed above, in some embodiments, a transition or transitions of a finite automaton may contain references to other "nested" finite automata. For example, the transition "<note>" of a first finite automata shown in FIG. 4b, representing the structure of an XML document, contains a reference to a second finite automata representing the contents of the <note> element. The nesting of finite automata is further illustrated in FIG. 6 and is discussed above.

Further, in some embodiments, nodes of the finite automata may include an "anything here" or "wildcard" transition (further illustrated in FIG. 5c) that match any data not described by other outgoing transitions from that node to handle data represented by the encoding values that deviates from the knowledge of the data.

As mentioned above, data represented by the values may deviate from the structure or content described by knowledge of the data, in some embodiments. As the decoder 112 processes the values to determine the data represented by the lower entropy encoding values, decoder 112 may encounter portions of data represented by the values that are not described by the knowledge of the data. In one embodiment, such "deviant" data 710 that are not described by knowledge of the data 704 may match a wildcard transition in a finite automaton. In one embodiment, when data matches a wildcard transition, decoder 112 or a related process may augment the finite automata by adding a new transition to match future instances of the deviant data directly without the use of the wildcard. Thus, the next time the same data represented by the values is encountered, it will match the newly added transition instead of the wildcard transition allowing decoder 112 to decode "deviant" data more efficiently. This may be accomplished, in various embodiments, by adding an additional transition to the node from which the wildcard transition matching the deviant data originated, the transition being in addition to the wildcard transition. In addition, decoder 112 or a related process may add a new nested finite automaton to represent the content of the deviant data. In one embodiment, the newly added nested finite automaton includes a start state with an outgoing wildcard transition pointing back to the start state.

FIGS. 5a-5c illustrate an example. In this example, the knowledge of the data in FIG. 5a is a schema fragment describing a "<note>" element containing a "<to>" element followed by a "<from>" element followed by a "<heading>" element followed by a "<body>" element. However, the XML data received in FIG. 5b has a "<date>" element following the "<heading>" element that is not described by the knowledge of data in FIG. 5a. Many of the nodes in FIG. 5c have outgoing wildcard transitions marked by * symbols in the figure. The deviant "<date>" element shown in FIG. 5b will first match the wildcard transition on the node pointed to by the "<heading>" transition causing the finite automaton to accept the deviant data. Accordingly, when the "<date>" element matches the wildcard transition decoder 112 or a related process may augment the finite automata by adding a third possible transition to the node pointed to by the "<heading>" transition, which will match future instances of the "<date>" element directly without the use of the wildcard. Thus, the finite automaton illustrated in FIG. 5c illustrates the augmented finite automaton, in which the "<heading>" element may be followed by a "<date>" element, a "<body>" element or anything else that matches the wildcard transition. The first time the deviant data represented by the values is encountered, it will match the "wildcard" transition. Decoder 112 may then decode the encoded values representing the wildcard transition followed by encoding values describing the deviant data (e.g., the type, name and possibly other information about the deviant data).

Decoder 112 or a related process may create the one or more finite automata by compiling the knowledge of the data.

For example, Xerces, the open source Apache™ XML Parser parses schemas and creates finite automata for the schemas to aid in validation. Such finite automata may be the finite automata utilized by decoder 112.

As shown, decoder 112 may then determine the data represented by the values, block 810, and generate the determined values. The determining may be based at least in part on the knowledge representation of the data, which may include one or more finite automata. The finite automata may facilitate representation of a large number of structural elements of the data in a small number of bit sequence values based on the location of the structural elements within a finite automaton. In FIG. 4d "<pet>" may contain "<ownerName>," "<petName>," or "<adopted>." Given that one of the three elements must appear in the content of "<pet>," only three distinct encoded values are required to represent the three elements (e.g., 0, 1 and 2). In one embodiment, any of these three values may be represented by at most two bits. "<ownerName>" may be represented by "00", "<petName>" my be represented by "01", and "<adopted>" may be represented by "10." Another node, not shown, may be followed by four possible transitions, which may be represented by four distinct values (e.g., 0, 1, 2 and 3). In one embodiment, the first of these transitions may be represented by the value 0. The first of these transitions does not need to have any correspondence or relation to "<ownerName>," but both may nonetheless be represented by the same value (i.e, 0). Thus, decoder 112 may use knowledge representation to map a sequence of lower entropy identical or overlapping values to a sequence of unrelated higher entropy data. In one embodiment, decoder 112 may decode each value independently using fixed or variable length codes. For example, decoder 112 may determine that a 2 bit fixed width code represents one of four distinct values. In other embodiments, decoder 112 may determine a more optimal variable length code that represents higher probability values in fewer bits than lower probability values (e.g., using Huffman or arithmetic coding). If a given node is followed by only a single out-going transition, the data represented by the transition may be represented by zero bits in the encoded values, or—in other words—represented by no encoding value.

Decoder 112 may, in some embodiments, determine the data represented by the above bit sequences, block 810, by traversing the finite automata as it processes the values. For example, if the finite automata have been created prior to processing the values, decoder 112 may traverse the automata concurrently with reading the values, and upon finding that the values representing the data correspond to a given transition in the finite automata, may represent the values as the data element corresponding to the transition.

Referring to FIG. 8 again, upon determining the represented data, decoder 112 may generate the data, block 812. The data may be any sequence of zero, one, or more bits, and may or may not have a structure. In various embodiments, the data is structured as XML data, character data, data from a database, structures defined by a programming language, and/or structures defined by an IDL. Further, data items specified by the structure of the data and contained within the data may be provided by decoder 112 as one or more of the data types integer, long, short, byte, string, date, Boolean, float, double, qualified name, byte array, and/or typed list. In some embodiments, the knowledge of the data (discussed more above) may facilitate automatic conversion of typed data items of the data to requested types from another data type or types determined by the knowledge of the data.

In various embodiments, decoder 112 provides the data to an API, block 814. The API may represent any sort of API known in the art, and may be implemented as a separate process or processes, or may form an executing layer of the decoder 112 process. Additionally, the API may be implemented on the same computer system as decoder 112 or on a separate computer system, in some embodiments connected by a network. In other embodiments, the API and decoder 112 may execute as separate processes on unconnected computer systems, and may require a user or users of the system to transfer the provided data. The API may also conform to one or more of the XML DOM, Simple API for XML (SAX), Streaming API for XML (StAX), and Java API for XML Binding (JAXB).

Further, as shown, the one or more processes may directly access the data from decoder 112, or may access the data from the decoder 112 via an API, block 816.

Figure 9:
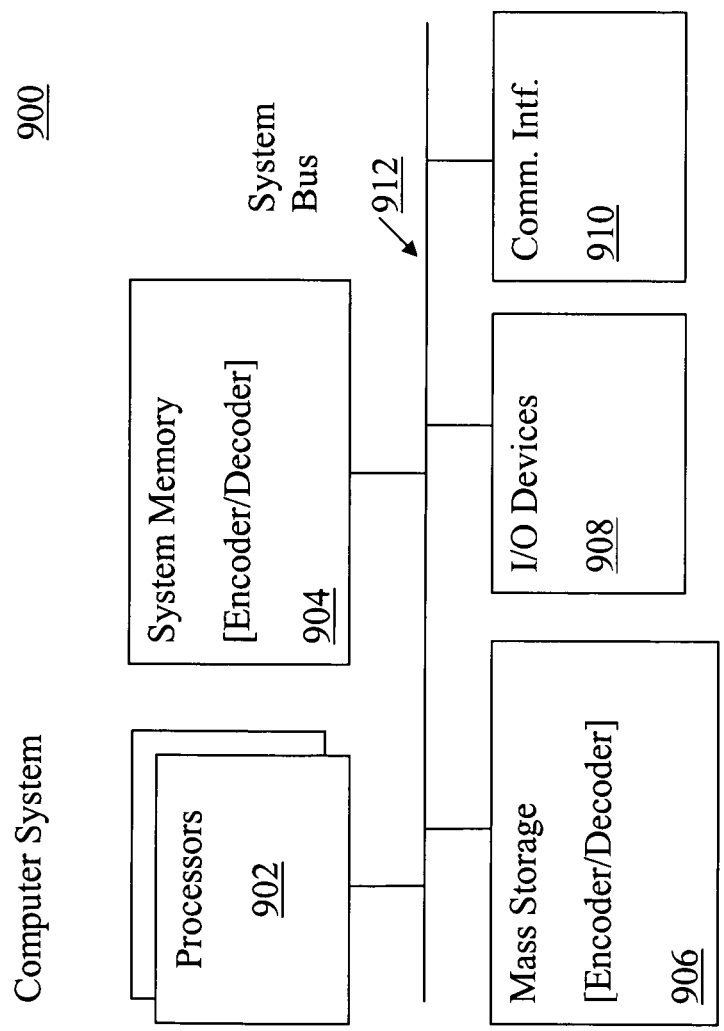
FIG. 9 illustrates an example computer system suitable for use to practice the encoder and/or decoder aspects of the present invention, in accordance with various embodiments.

FIG. 9 illustrates an example computer system suitable for use to practice the encoder and/or decoder aspects of the present invention, in accordance with various embodiments. As shown, computer system 900 includes one or more processors 902 and system memory 904. Additionally, computer system 900 includes input/output devices 908 (such as keyboard, cursor control, and so forth). The elements are coupled to each other via system bus 912, which represents one or more buses. In the case of multiple buses, they are bridged by one or more bus bridges (not shown). Each of these elements performs its conventional functions known in the art. In particular, system memory 904 and mass storage 906 are employed to store programming modules adapted to perform the encoder and/or decoder aspects of the present invention, and a permanent copy of the programming instructions implementing the programming modules adapted to perform the encoder and/or decoder aspects of the present invention, respectively. The permanent copy of the instructions implementing the programming modules adapted to perform the encoder and/or decoder aspects of the present invention may be loaded into mass storage 906 in the factory, or in the field, through a distribution medium (such as an article of manufacture with storage medium, not shown) or through communication interface 910 (e.g., from a distribution server). The constitution of these elements 902-912 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method comprising:
receiving encoded data into a computer memory, wherein the encoded data represents an encoded form of unencoded data; and
recovering the unencoded data from the encoded data, using a processor, based at least in part on one or more knowledge representations describing the unencoded data;
wherein the knowledge representations describing the unencoded data represent one or more of:
a formal language structure of the unencoded data, the formal language structure being defined by one or more of a grammar, a regular expression, a schema language, a programming language, and an interface definition language,
data types of the unencoded data,
likelihood of occurrence of one or more data items in the unencoded data,
one or more ignorable data items in the unencoded data,
one or more re-orderable data items in the unencoded data,
one or more parameters used to control encoding of the in the unencoded data or decoding of the encoded data,
one or more identifiers for algorithms used to encode the unencoded data, or
one or more associations between data types and encoding algorithms; and
wherein the unencoded data has more number of bits than the encoded data.

2. The method of claim 1, wherein said receiving of the encoded data comprises receiving the encoded data through an application interface, and wherein the unencoded data may be recovered in one or more forms selected from the group consisting of a tree structure, a stream of decoded values of data items, a stream of bytes, a structure defined by a programming language, and a structure defined by an interface definition language.

3. The method of claim 2, wherein said application interface is typed, and wherein the unencoded data may include one or more data types selected from the group consisting of an integer data type, a long data type, a short data type, a byte data type, a string data type, a date data type, a Boolean data type, a floating point data type, a double precision data type, a qualified name, a byte array and a typed list.

4. The method of claim 2, wherein said recovering the unencoded data comprises using knowledge representations describing data to assist conversion of encoded data provided to the application interface to said unencoded data.

5. The method of claim 1, wherein said unencoded data are selected from the group consisting of XML data, character data, data from a database, structures defined by a programming language, and an interface definition language.

6. The method of claim 1, wherein said received encoded data comprises a sequence of one or more encoded data items that are not described by said knowledge representations, and one or more encoded data items that are described by said knowledge representations.

7. The method of claim 1, further comprising receiving or deriving at least a portion of the knowledge representations describing the data, from one or more selected from the group consisting of a database schema, a grammar, a regular expression, a schema language, a programming language, and an interface definition language.

8. The method of claim 1, further comprising deriving, before or during said recovering, at least a portion of the knowledge representations describing the unencoded data by analyzing one or more examples of the encoded data.

9. The method of claim 1, wherein the knowledge representations describing the unencoded data comprise one or more finite automata, the finite automata being deterministic or non-deterministic, with the one or more finite automata containing references to one or more nested finite automata.

10. The method of claim 1, wherein the knowledge representations describing the unencoded data are compiled on a separate computing device and/or by a separate process, or are provided in XML format.

11. The method of claim 1, further comprising receiving a first plurality of knowledge representations describing the unencoded data, and deriving a second plurality of knowledge representations, based at least in part on a subset of the first knowledge representations, the second knowledge representations including a description of a sequence of data items that are not described by the first knowledge representations, and including data items defined by the first knowledge representations.

12. The method of claim 1, wherein said recovering comprises determining, based at least in part on the knowledge representations describing the data, at least one of:
which data items are likely to occur at one or more positions in the unencoded data,
data corresponding to one or more unique sequences of representation values in the unencoded data,
values corresponding to one or more distinct sequences of representation bits in the unencoded data,
one or more omitted data items without having received encoding values for them,
one or more data items implicitly encoded using zero bit,
one or more algorithms to be invoked to decode one or more of the encoding values, or
one or more data items which corresponding encoding values were reordered.

13. The method of claim 1, further comprising:
recovering additional values included among the encoded data representing at least a portion of the knowledge of the unencoded data received, derived or modified and/or one or more algorithms used to generate the encoded data; and
using the recovered additional values to assist at least in part to recover the unencoded data.

14. The method of claim 1, further comprising receiving the encoded data from a sender device having an encoder adapted to generate the encoded data.

15. An apparatus comprising:
a receiver adapted to receive encoded data; and
a decoder coupled to the receiver to recover a plurality of data from the encoded data, using a processor, based at least in part on one or more knowledge representations describing the plurality of data;
wherein the knowledge represntations of the plurality of data represent one or more of:
a formal language structure of the plurality of data, the formal language structure being defined by one or more of a grammar, a regular expression, a schema language, a programming language, and an interface definition language,
data types of the plurality of data,
likelihood of occurrence of one or more data items in the plurality of data,
one or more ignorable data items in the plurality of data, or
one or more re-orderable data items in the plurality of data; and
wherein the recovered plurality of data has more number of bits than the encoded data.

16. The apparatus of claim 15, wherein said decoder is further adapted to determine, based at least in part on the knowledge representations describing the plurality of data, at least one of:
which data items are likely to occur at one or more positions in the plurality of data,
one or more data items corresponding to a unique sequence of representation values in the plurality of data,
one or more unique sequence of values corresponding to a distinct sequence of representation bits in the plurality of data,
one or more omitted data items without having received encoding values,
one or more data items implicitly encoded using zero bit,
one or more algorithms to be invoked to decode one or more of the encoding values, or
one or more data items which encoding values are reordered.

* * * * *